(12) United States Patent
Barry et al.

(10) Patent No.: US 8,584,255 B2
(45) Date of Patent: Nov. 12, 2013

(54) NETWORKED CONDITIONAL ACCESS MODULE

(75) Inventors: Richard John Barry, Basingstoke (GB); Adrian Charles Paskins, Basingstoke (GB)

(73) Assignee: Sony United Kingdom Limited, Basingstoke (GB)

(*) Notice: Subject to any disclaimer, the term of this patent is extended or adjusted under 35 U.S.C. 154(b) by 1245 days.

(21) Appl. No.: 11/512,565

(22) Filed: Aug. 30, 2006

(65) Prior Publication Data

US 2007/0073945 A1    Mar. 29, 2007

Related U.S. Application Data

(63) Continuation of application No. 09/674,816, filed on Dec. 4, 2000, now Pat. No. 7,240,113.

(30) Foreign Application Priority Data

May 5, 1999    (WO) .................. PCT/GB99/01392

(51) Int. Cl.
| | | |
|---|---|---|
| G06F 17/30 | (2006.01) | |
| H04N 21/2365 | (2011.01) | |
| H04N 7/173 | (2011.01) | |
| H04N 5/76 | (2006.01) | |

(52) U.S. Cl.
USPC ............. 726/27; 713/153; 713/192; 380/212; 725/31; 725/82; 725/88; 725/89; 725/133; 725/141; 710/5; 710/72

(58) Field of Classification Search
USPC .................. 713/153, 192; 726/27; 710/72, 5; 725/31, 82, 88, 89, 133, 141; 380/212
See application file for complete search history.

(56) References Cited

U.S. PATENT DOCUMENTS

| | | | | |
|---|---|---|---|---|
| 5,473,609 A | * | 12/1995 | Chaney | 370/312 |
| 5,509,073 A | * | 4/1996 | Monnin | 380/229 |
| 5,590,202 A | | 12/1996 | Bestler et al. | |
| 5,699,426 A | * | 12/1997 | Tsukamoto et al. | 380/240 |
| 5,757,909 A | * | 5/1998 | Park | 380/201 |

(Continued)

FOREIGN PATENT DOCUMENTS

| | | |
|---|---|---|
| EP | 877499 A2 * | 11/1998 |
| JP | 2-31290 | 2/1990 |

(Continued)

OTHER PUBLICATIONS

Hurley, T.R. "Evolution of the Digital Set Top Box", 1996.*

(Continued)

*Primary Examiner* — Michael Simitoski
(74) *Attorney, Agent, or Firm* — Frommer Lawrence & Haug LLP; William S. Frommer; Paul A. Levy

(57) ABSTRACT

A networked Conditional Access Module provided on an IEEE 1394 network, by defining a Conditional Access Module as a Conditional Access Subunit of the IEEE 1394 network. There is provided an AV/C Conditional Access Commands to allow communication between the Conditional Access Subunit and other Subunits on the network. The Conditional Access Subunit is configured to receive AV/C Conditional Access Commands over the IEEE 1394 network from another subunit, and means to is also configured to transmit AV/C responses over the IEEE 1394 network in response to the received AV/C Conditional Access Commands.

10 Claims, 15 Drawing Sheets

(56) References Cited

U.S. PATENT DOCUMENTS

| | | | | |
|---|---|---|---|---|
| 5,774,548 | A | * | 6/1998 | Bando et al. ............... 380/212 |
| 5,790,172 | A | * | 8/1998 | Imanaka ....................... 725/8 |
| 5,796,829 | A | | 8/1998 | Newby et al. ................ 705/54 |
| 5,818,934 | A | * | 10/1998 | Cuccia ....................... 380/216 |
| 5,832,085 | A | * | 11/1998 | Inoue et al. ................ 386/124 |
| 5,852,290 | A | * | 12/1998 | Chaney ...................... 235/492 |
| 5,937,067 | A | * | 8/1999 | Thatcher et al. ........... 380/212 |
| 5,991,400 | A | * | 11/1999 | Kamperman .............. 380/239 |
| 6,040,851 | A | | 3/2000 | Cheng et al. ............... 725/132 |
| 6,078,594 | A | * | 6/2000 | Anderson et al. .......... 370/498 |
| 6,118,873 | A | * | 9/2000 | Lotspiech et al. ......... 380/277 |
| 6,154,206 | A | * | 11/2000 | Ludtke ....................... 713/168 |
| 6,289,314 | B1 | * | 9/2001 | Matsuzaki et al. ............ 705/1 |
| 6,373,904 | B1 | | 4/2002 | Sakamoto et al. ......... 375/316 |
| 6,424,714 | B1 | | 7/2002 | Wasilewski et al. ....... 380/200 |
| 6,430,362 | B1 | * | 8/2002 | Okamoto et al. .......... 386/112 |
| 6,467,093 | B1 | * | 10/2002 | Inoue et al. ................ 725/151 |
| 6,591,419 | B2 | | 7/2003 | Barry et al. .................. 725/25 |
| 6,674,858 | B1 | * | 1/2004 | Kimura et al. ............. 380/202 |
| 7,239,709 | B1 | * | 7/2007 | Yamada et al. ............ 380/281 |

FOREIGN PATENT DOCUMENTS

| | | |
|---|---|---|
| JP | 8-46948 | 2/1996 |
| JP | 08-107389 | 4/1996 |
| JP | 9-46334 | 2/1997 |
| JP | 9-51343 | 2/1997 |
| JP | 9-326814 | 12/1997 |
| JP | 10-505720 | 6/1998 |
| WO | WO 96/07267 | 3/1996 |

OTHER PUBLICATIONS

Okoth, et al., "DVB: Common Interface als ideale interactive Multimedia-Umgebung", Femesh-Und Kino-Technik, vol. 51, No. 12, Jan. 1, 1997 (XP002088534).

"Common Interface Specification for Conditional Access and other Digital Video Broadcasting Decoder Applications", European Standard EN50221 (English Version) Feb. 1997.

* cited by examiner

Fig.4.

| Address offset | msb ··· lsb |
|---|---|
| 00₁₆ | specification_length |
| 01₁₆ | system_id |
| 02₁₆ | implementation_profile_id |
| 03₁₆ | number_of_CA_system_ids(m) |
| 04₁₆ | CA_system_id_length[0] |
| 05₁₆ | CA_system_id[0] |
| ... | ... |
| ... | CA_system_id_length[m-1] |
| ... | CA_system_id[m-1] |

Fig.5(a).

| Address offset | msb | | | | | | | lsb |
|---|---|---|---|---|---|---|---|---|
| 00 00 16 | descriptor_length ||||||||
| 00 01 16 | |||||||||
| 00 02 16 | general_CA_subunit_status_info_block ||||||||
| ... | |||||||||
| ... | source_plug_status_area_info_block ||||||||
| ... | |||||||||
| ... | |||||||||

Fig.5(b).

| Address offset | msb | | | | | | | lsb |
|---|---|---|---|---|---|---|---|---|
| 00 00 16 | compound_length ||||||||
| 00 01 16 | |||||||||
| 00 02 16 | info_block_type=90 00 16 (general_CA_subunit_status_area_info_block) ||||||||
| 00 03 16 | |||||||||
| 00 04 16 | primary_field_length ||||||||
| 00 05 16 | |||||||||
| 00 06 16 | reserved ||||||||
| 00 07 16 | available_bandwidth_upper ||||||||
| 00 08 16 | available_bandwidth_lower ||||||||

Fig.5(c).

| Address offset | | |
|---|---|---|
| $00_{16}$ | compound_length | |
| $01_{16}$ | | |
| $02_{16}$ | info_block_type=90 $01_{16}$(source_plug_status_area_info_block) | |
| $03_{16}$ | | |
| $04_{16}$ | primary_fields_length | |
| $05_{16}$ | | |
| $06_{16}$ | number_of_source_plugs (n) | |
| $07_{16}$ | nested plug_status_info_block structures | |
| ... | | |
| ... | | |

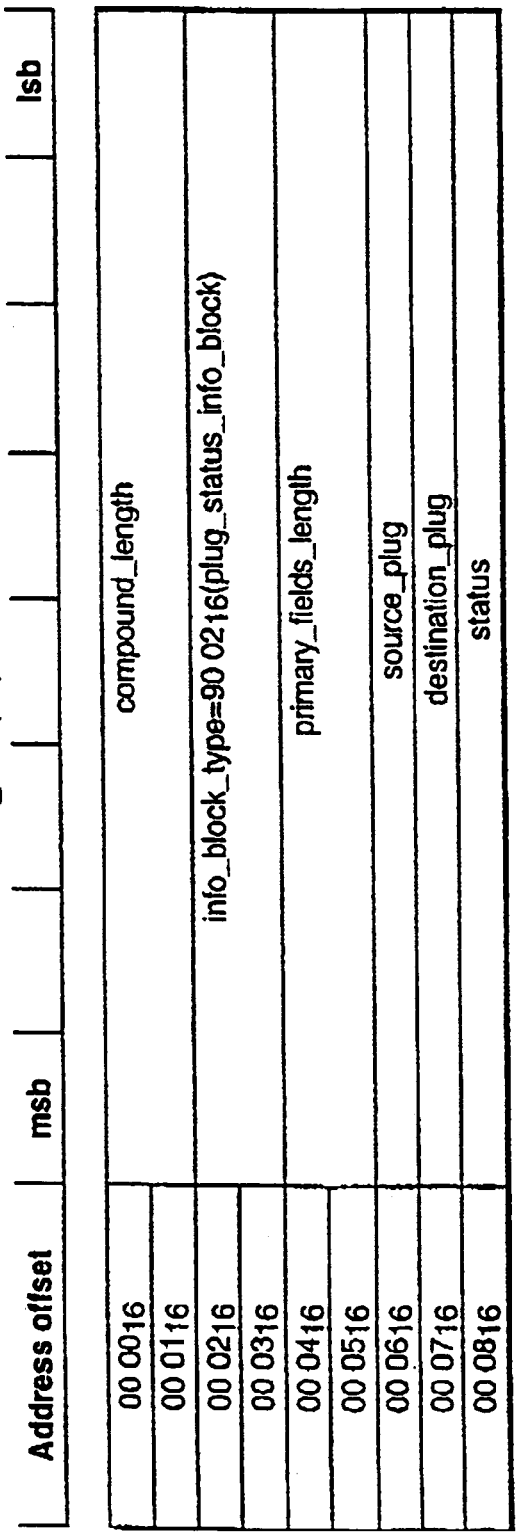

Fig.6.

| Opcode | Value | ctype | | | Comments |
| --- | --- | --- | --- | --- | --- |
| | | C | S | N | |
| CA_ENABLE | CC₁₆ | ✓ | ✓ | ✓ | Used to instruct the CA subunit to begin descrambling the service defined in the broadcast specific data |
| CA_ENTITLEMENT | CD₁₆ | — | ✓ | ✓ | Used to allow a controller to query the CA subunit to determine whether the user has entitlement for a specified service |
| SECURITY | 0F₁₆ | ✓ | ✓ | ✓ | Used for validation purposes between a controller and the CA subunit |

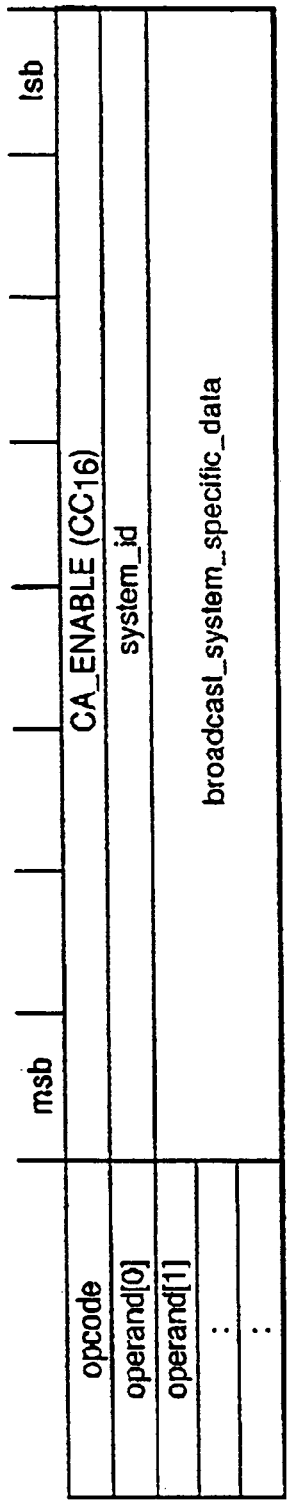

Fig.7(a).

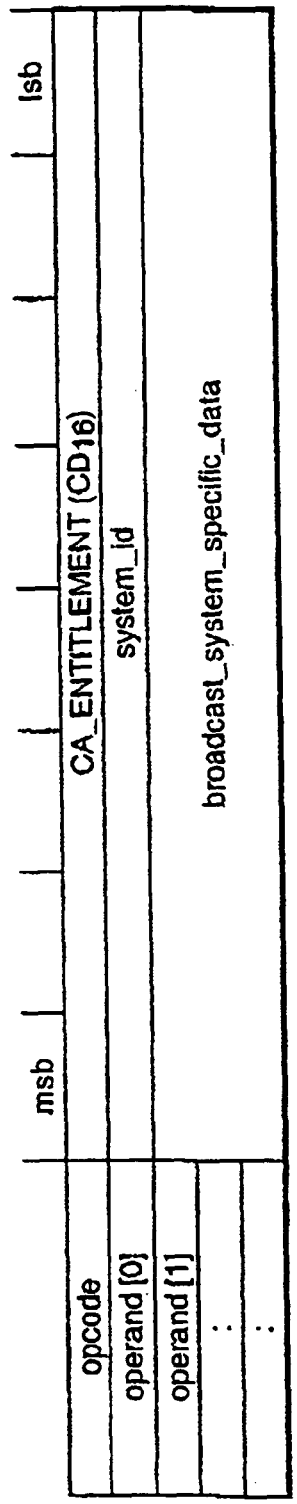
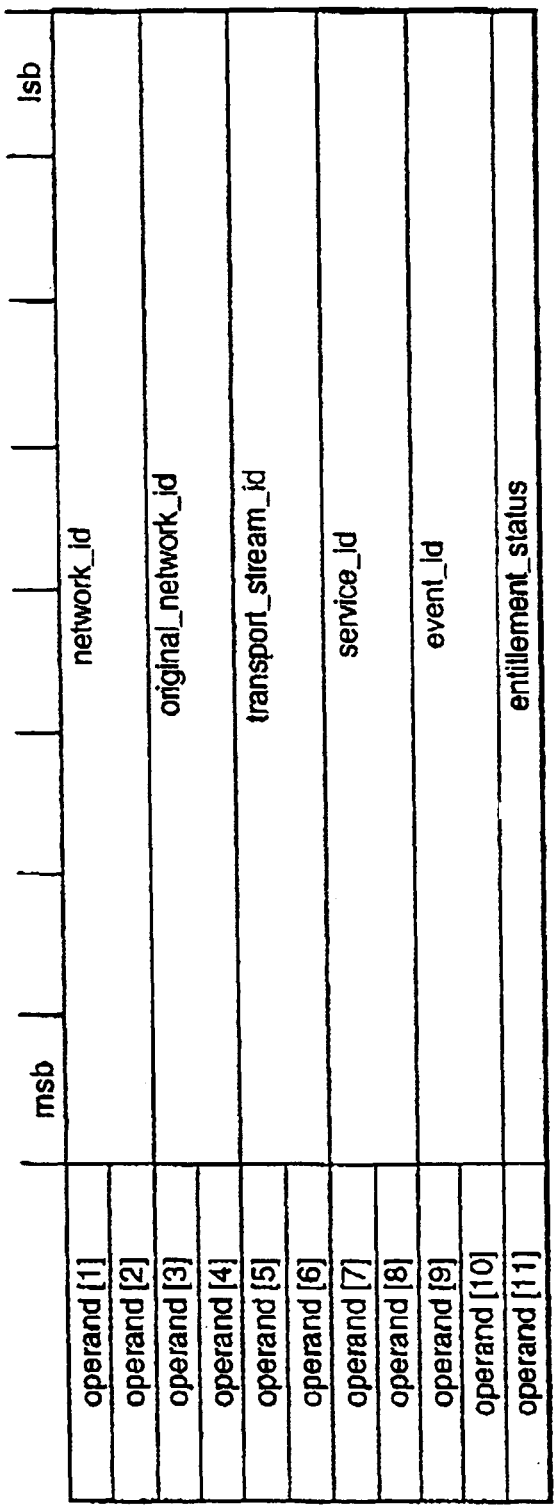
Fig.12(a).
Fig.12(b).

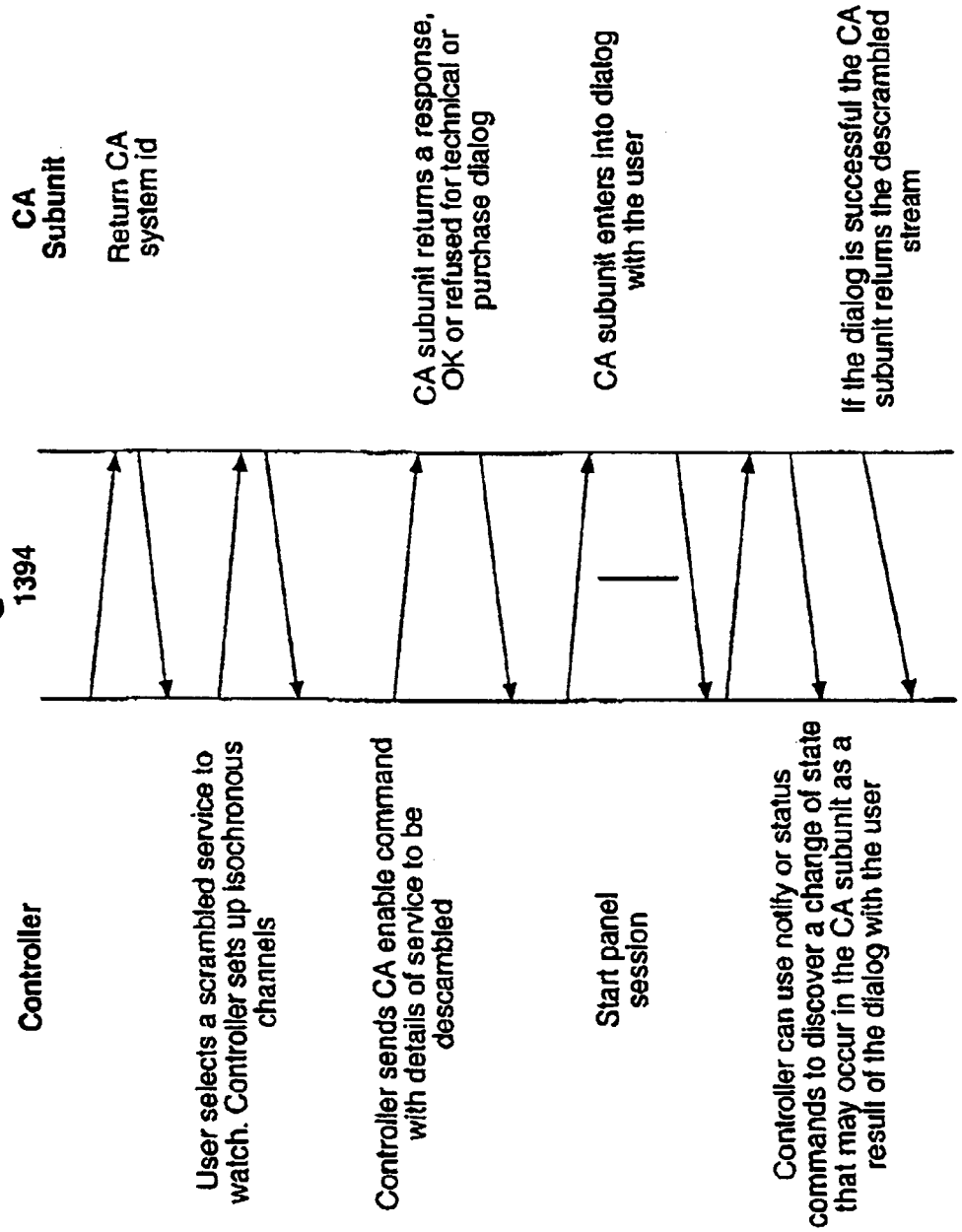

NETWORKED CONDITIONAL ACCESS MODULE

This application is a Continuation of U.S. application Ser. No. 09/674,816, filed Dec. 4, 2000, now U.S. Pat. No. 7,240,113, which application is hereby incorporated by reference in its entirety herein.

The present invention relates to a networked conditional access module and methods of implementing such a module on a network. More particularly, it relates to the provision of a Conditional Access Subunit for an IEEE 1394 network.

With the development of digital multimedia and in particular digital television, it has been proposed to provide a conditional access module. In the field of digital video processing, it is known to code digital video signals such that special processing is needed in the receiver to be able to reproduce the video signals. In particular, it has been proposed to provide a conditional access module which can perform all of the descrambling and other conditional access functions of the digital TV receiver. This allows conditional access and signal decoding functions to be separated from a host receiver, such that a generic digital TV receiver can operate with many different conditional access systems in different conditional access modules.

To allow communication between a conditional access module and a digital TV receiver, a common interface has been proposed and standardized by CENELEC (EN50221 Common Interface Specification for Conditional Access and other Digital Video Broadcasting Decoder Applications). This standard Common Interface defines a transport stream interface in which various virtual channels are time multiplexed and a command interface over which various additional command data are sent The common interface thus allows connection of a conditional access module to a digital TV receiver or indeed any other digital video device.

As a basis for the present invention, it is now recognised that it would be advantageous to provide a conditional access module on a local network of digital multi-media devices including audio and video devices, such that the various functions available in the conditional access module could be provided to all of the devices on the network A standard has been proposed for connecting together various digital video devices on a local network. In particular, IEEE 1394-1995 is an IEEE standard for a high performance serial bus. It defines a bus, which will be referred to as an IEEE 1394 serial bus, for connecting together various digital consumer audio/visual products.

The IEEE 1394 specification defines a physical link connector, electrical signalling and a set of link and transaction protocols allowing the serial bus to self configure and carry audio, video and control information efficiently. A further set of additional protocols have also been defined to carry MPEG data and provide control mechanisms between different items of equipment on the IEEE 1394 serial bus. These protocols are defined in the specification "Digital Interface for Consumer Electronic Audio/Video Equipment" (IEC61883).

The IEC61883 specification enables several command protocols to be used. One set of commands are known as audio/video control—command transactions (AV/C-CTS) and are specified in the AV/C Digital Interface Command Set Document development by the IEEE 1394 Trade Association (see AV/C Digital Interface Command Set Version 2.0D Mar. 26, 1997 Audio/Video Working Group of the 1394 Trade Association). The AV/C CTS defines a command set for consumer and professional audio/visual equipment The AV/C CTS commands are carried within the FCP (Function Control Protocol) packet format defined by IEC61883.

An object of the present invention is to provide means by which a conditional access module may be provided on an IEEE 1394 network.

According to the present invention, there is provided a method of providing a Conditional Acess Module on an IEEE 1394 network, the method comprising:

defining a Conditional Access Module as a Conditional Access Subunit of the IEEE 1394 network;

providing AV/C Conditional Access Commands to allow communication between the Conditional Access Subunit and other Subunits on the network.

According to the present invention, there is provided a conditional access subunit for connection to an IEEE 1394 network, the subunit including:

means to receive AV/C Conditional Access Commands over the IEEE 1394 network from another subunit; and means to transmit AV/C responses over the IEEE 1394 network in response to the received AV/C Conditional Access Commands.

According to the present invention, there is provided a subunit for use with a conditional access subunit on an IEEE 1394 network, the subunit including:

means to transmit AV/C Conditional Access Commands over the IEEE 1394 network to the conditional access subunit; and means to receive AV/C responses from the conditional access subunit over the IEEE 1394 network in response to the transmitted AV/C Conditional Access Commands.

In this way, by treating the conditional access module as a subunit of the IEEE 1394 network and by providing conditional access commands as part of the AV/C command set, a conditional access module can be fully integrated on the network.

Preferably, the conditional access command includes a CA enable command and/or a CA entitlement command. The AV/C conditional access commands may also include a security command.

In this way, the CA enable command can be used to instruct the CA subunit as to which service is should descramble.

The enable command may include control commands as well as status and notify commands.

The CA entitlement commands may be used to interrogate the conditional access subunit to determine what entitlement the user has to services. It may be a status or notify type command.

According to the present invention, there is also provided a conditional access subunit for connection to an IEEE 1394 network for use in descrambling a transport stream received over the network wherein the conditional access subunit, having descrambled the transport stream, introduces a local scrambling before retransmitting the transport stream to other subunits on the network, such that only authorised subunits on the network capable of local descrambling can receive the information in the transport stream.

In this way, once a conditional access subunit has descrambled a program, the program does not become available for unauthorised copying. It can be transported only to an authorised subunit on the network for instance a television display. This system can also be used to ensure that a particular conditional access subunit can only be used in conjunction with other particular types of subunit with the same local descrambling capabilities.

According to the present invention there is also provided a conditional access subunit for connection to an IEEE 1394 network having a tuner subunit, the conditional access subunit having means for periodically contacting the tuner subunit to request the received transport stream for a period of time sufficient to allow the conditional access subunit to update the entitlement management messages stored in the conditional access subunit In this way, even if a user does not operate the conditional access until for some time, such that entitlement information would have otherwise been missed, the conditional access subunit automatically requests transport stream information periodically so as to obtain that entitlement information.

The present invention will be more clearly understood from the following description, given by way of example only, with reference to the accompanying drawings, in which:

FIG. 4 illustrates a system specification for use with the descriptor of FIG. 3, FIG. 5(a) illustrates a CA status descriptor;

FIG. 5(b) illustrates a CA subunit status area info block;

FIG. 5(c) illustrates a source plug status area info block;

FIG. 5(d) illustrates a plug status info block,

FIG. 6 illustrates CA subunit commands;

FIG. 7(a) illustrates a CA enable control command;

FIG. 12(a) illustrates a CA entitlement response;

FIG. 12(b) illustrates the broadcast system specific data of FIG. 12(a);

FIG. 14 illustrates command exchange between controller and CA subunit; and

Figure 1:
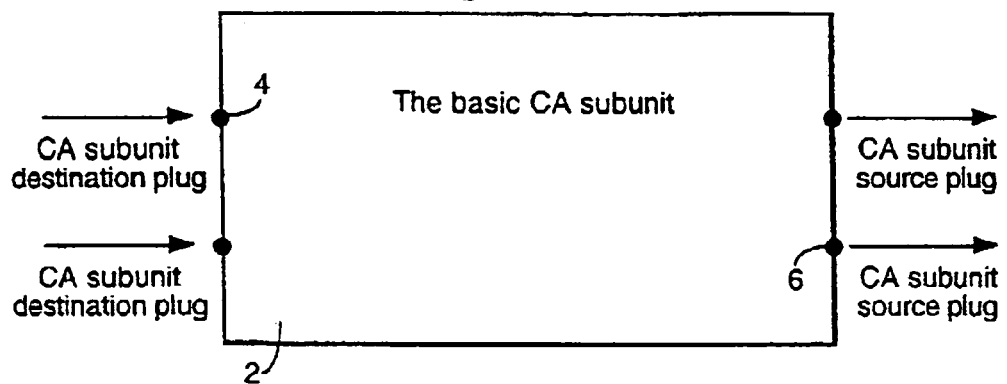
FIG. 1 illustrates a CA subunit.

A requirement exists for a Conditional Access (CA) system that allows the manufacturer of a Digital Television Receiver (DTV) to access scrambled services from several broadcasters. This is achieved by defining a protocol that allows the CA system to reside on a module which can then be connected to the DIV allowing that DTV to access the service. A solution exists in the form of a PC Card connected to a single receiver. However there exists a new requirement for a Networked Conditional Access Module (NCAM). The main requirements for this device are:— flexible form factor flexible access, for example peer to peer communication flexible location This application proposes the format of the additional AV/C subunits that are required to implement the NCAM. The AV/C model for the NCAM will provide a conditional access system that is tailored for use on an IEEE 1394-1995 based digital network.

The purpose of the Networked Conditional Access Module (NCAM) is to provide conditional access functionality. The NCAM uses a logical collection of resources that allow the descrambling of selected services to take place. The required resources for the NCAM can exist either in one location, for example inside a DTV, or be distributed throughout the In Home Digital Network (IHDN).

The NCAM relies on both existing and additional subunits. The existing subunits that the NCAM makes use of are:—

Tuner subunit

Panel subunit

In order to implement a networked conditional access module on an IEEE 1394 network, an AV/C subunit is defined for the conditional access module. In particular, a conditional access subunit models the core functionality of a descrambler. The CA subunit receives scrambled streams, descrambles them and then outputs a descrambled stream. The CA subunit may communicate with other required subunits via asynchronous commands across the IEEE 1394 network.

The Tuner subunit is used as the data source, the Panel subunit is used to provide information to the user and receive input from the user. The CA subunit contains the descrambling functionality and can make use of smart card and modem subunits.

The resources that are required for an NCAM to function may be implemented privately within a single module. If a manufacturer wishes to develop an NCAM with the smart card and modem functionality integrated for the exclusive use of the NCAM this is allowed. In such a case the NCAM would only implement the CA subunit and make use of the tuner and panel subunits in other devices. It is likely for security reasons that an NCAM would be implemented with a private smart card. The smart card subunit is included for when a smart card could be used for other applications, for example a data card or "electronic cash" card.

The NCAM can also be implemented with distributed resources. In this case the CA subunit would work in conjunction with subunits embedded in other objects distributed throughout the digital network.

Depending on the service to be descrambled, all or some of the resources will be required. In a simple system that relies on a Smart Card to be inserted to authenticate the service the modem is not required, a simple form of display device is required to prompt the user to insert the card but interaction is not necessary. A more complicated system, for example a pay per view (PPV) system, requires all of the resources to allow a choice of services to be presented to the user and to allow the user make a selection. Therefore the NCAM may operate with reduced functionality if not all the required subunits are present.

FIG. 1 illustrates the basic CA subunit 2. This can be a stand alone device or integrated into another device.

The CA subunit destination plug 4 is the input to the subunit 2. The signal format is compliant with the system(s) supported by the CA mechanism. The CA subunit destination plug 4 can connect either directly to the serial bus (1394) input plug or to the source plug of another suitable subunit; for example the input to the CA subunit could be a tuner subunit.

The CA subunit source plug 6 is the output of the subunit 2. The signal format is compliant with the system(s) supported by the CA mechanism. The CA subunit source plug 6 can connect either directly to the serial bus output plug or to the destination plug of another suitable subunit.

A CA subunit that implements a single source and destination plug is potentially capable of descrambling one or more services within an isochronous channel from a single source, providing the CA system is compatible with the source material.

Depending on the hardware capability of the CA subunit it is possible to implement multiple destination and source plugs. There are an equal number of source and destination plugs. Such a configuration allows a single CA subunit to provide descrambling of several independent streams/services at the same time. This model allows a very flexible, distributed AV network environment.

Thus, in other words, the CA subunit can receive different streams from one or more other subunits on the network, descramble them and re-route them to one or more other subunits as required. Any limitation is due principally only to bandwidth.

When making connections between the CA subunit destination plug and either the serial bus input or another subunit the connection is established manually using a CONNECT command. This connection is made before issuing a CA command. If the CA subunit is operating in a stand-alone mode then the destination and source plugs of the subunit can be permanently connected to the input and output serial bus plugs.

If the CA subunit has an existing connection which has been locked and an additional connection is requested then a response of REJECTED is returned. If the connection is permanent then the conflicting command generates a response of NOT IMPLEMENTED.

The CONNECT command is used to connect the CA subunit source plugs to either another subunit or the serial bus output plugs.

All current connections of CA subunits are reported by the CONNECT status or CONNECTIONS status commands. This includes all permanent connections. A controller can determine if a connection is permanent by examining the "perm" flag of the responses for the CONNECT status and CONNECTIONS status commands.

The connection of the CA subunit to other subunits is implementation specific. Whether it is logical to allow the connection of the CA subunit to certain other subunits is considered at implementation time.

Figure 2:
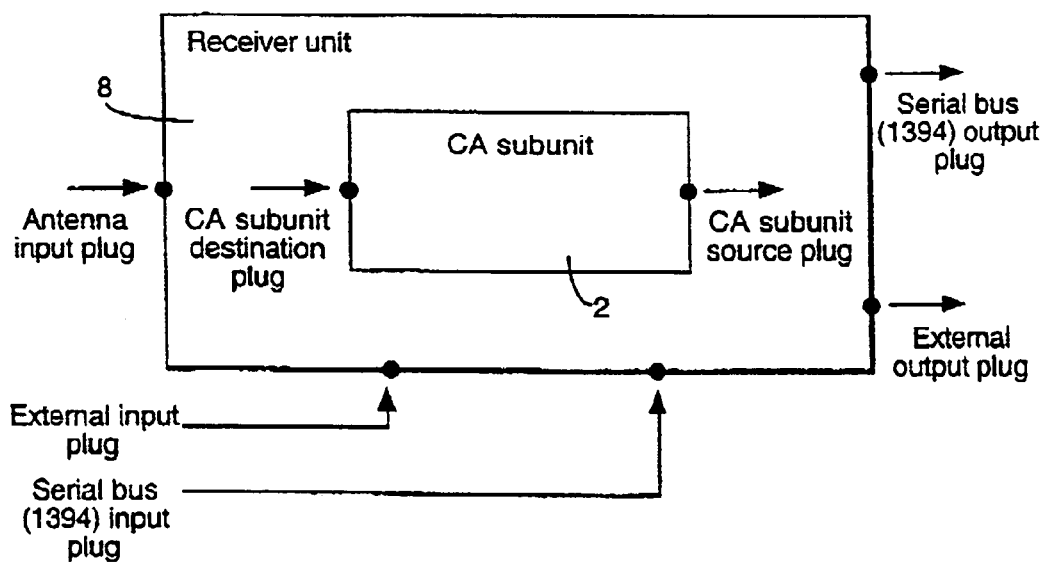
FIG. 2 illustrates CA subunit logic connections.

A CA subunit may be embodied inside a receiver, which is a device defined as one that contains a tuner subunit, or as a stand-alone device. FIG. 2 illustrates how a CA subunit appears in a receiver 8; in a stand-alone device, there would likely be no antenna input plug (only 1394 serial bus and possibly "external" input plugs).

The following table illustrates the various combinations of connections between a receiver unit and a CA subunit plugs and which ones are valid or not. All invalid connections generate a response of NOT IMPLEMENTED.

| Non CA Subunit Plug | CA Subunit Plug | Connection Valid? | Comments |
| --- | --- | --- | --- |
| External antenna input plug | CA destination plug | NO | X |
| External antenna input plug | CA source plug | NO | X |
| External input plug | CA destination plug | NO | X |
| External input plug | CA source plug | NO | X |
| External output plug | CA destination plug | NO | X |
| External output plug | CA source plug | NO | X |
| Serial bus input plug | CA destination plug | YES | This connection must be created using a CONNECT command, or it may be a permanent connection |
| Serial bus input plug | CA source plug | NO | X |
| Serial bus output plugs | CA destination plug | NO | X |
| Serial bus output plugs | CA source plug | YES | This connection must be created using a CONNECT command, or it may be a permanent connection |
| Subunit source plug | CA destination plug | YES | This connection must be created using a CONNECT command, or it may be a permanent connection |
| Subunit source plug | CA source plug | NO | X |
| Subunit destination plug | CA destination plug | NO | X |
| Subunit destination plug | CA source plug | YES | This connection must be created using a CONNECT command, or it may be a permanent connection |

When issuing the CONNECT Command the lock bit is used to ensure that connections are not broken by third parties.

The CA subunit can handle both full and partial transport streams. It is beneficial for the source to create a partial transport stream containing the elements of the service it wishes descrambled in order to save bandwidth on the bus. In the case where a partial transport stream is created and the EMMs (Entitlement Management Messages) are embedded in the transport stream, the souse includes the EMMs in the partial transport stream. It will not be possible for the CA subunit to descramble the desired services if the data contained in the EMMs is not present.

The CA system is used to prevent unauthorised access to broadcast material. Once the material has been descrambled, it can be protected when carried over the IHDN (In Home Digital Network). In particular, the CA subunit can implement a suitable Copy Protection system on both its destination and source plugs.

The CA subunit is provided with a subunit identifier. For each particular CA subunit, the subunit identifier describes the characteristics of the broad cast system(s) and CA system(s) supported by that CA subunit. More than one broadcasting system and CA system may be supported by a particular CA subunit. With the use of this information, other subunits on the network, particularly, the controller, will know how each CA subunit may be used.

Figure 3:
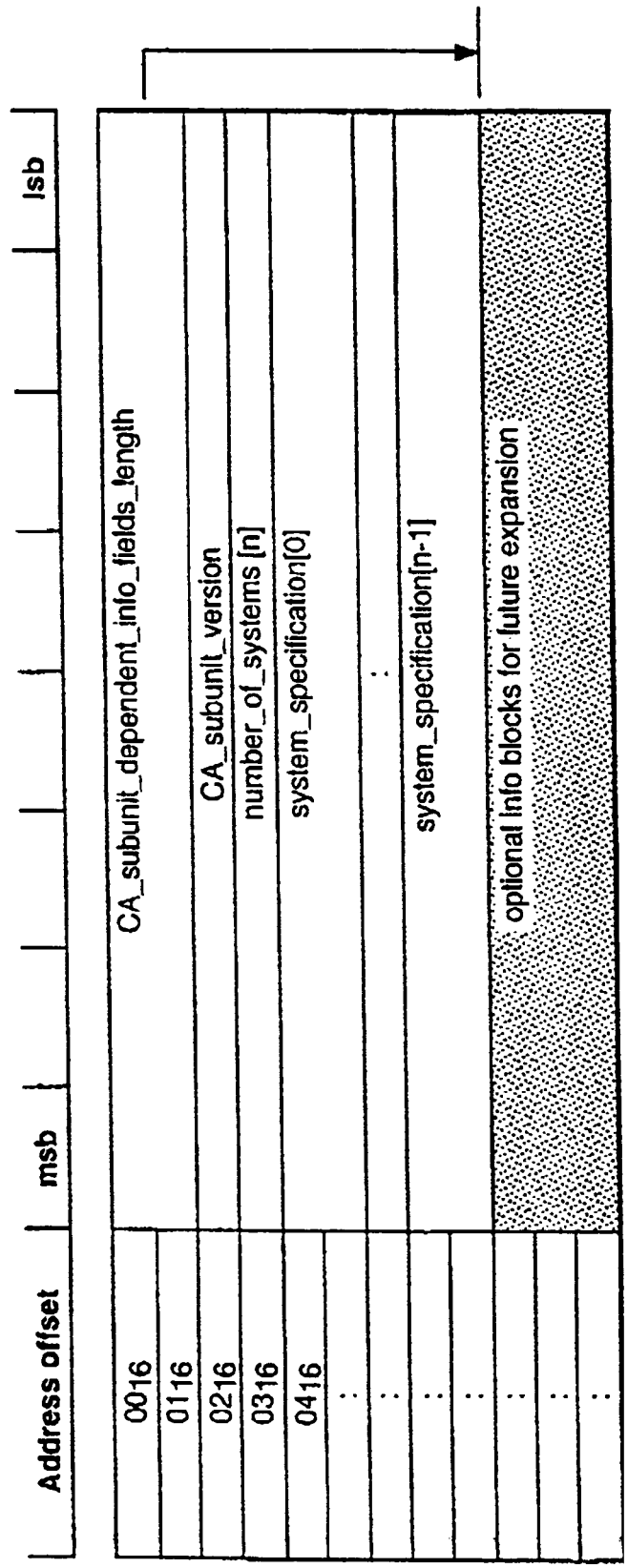
FIG. 3 illustrates a CA subunit identifier descriptor.

FIG. 3 illustrates the subunit dependent information which is contained within the subunit identifier descriptor.

The CA_subunit_dependent_info_fields_length field specifies the number of bytes for the non-info block fields of the subunit dependent information; in this case, through the system_specification[n-1].

A controller on the network preferably finds any number of information blocks following this field, such that the CA subunit dependent information can be extended in the future. Controllers can easily determine if any info blocks exist here by comparing the CA_subunit_dependent_length and CA_subunit_dependent_info_fields_length fields. If the following formula is true:

CA_subunit_dependent_length>(CA_subunit_dependent_info_fields_length+2) then info blocks exist in this structure.

The CA_subunit_version field indicates the version number of CA subunit command specification that the CA subunit conforms to. The upper 4 bits show the major version number and the lower 4 bits the minor version number.

| CA_subunit_version | meaning |
|---|---|
| $10_{16}$ | Version 1.0 of the CA subunit specification |
| all others | Reserved for future specification |

The number_of_systems field specifies how many broadcast systems are supported by this CA subunit The system_specification field describes each broadcast system and is illustrated in FIG. 4.

The specification_length field indicates the size, in bytes of the entire system_specification structure.

The system_id field indicates a broadcast system that the CA subunit supports. The following broadcast systems are currently defined:

| system_id | name |
|---|---|
| $20_{16}$ | DVB |
| other values | reserved |

The implementation_profile_id field specifies the profile ID of the CA subunit for this system_id A CA subunit may be implemented with a different profile for each of the broadcast systems that it supports. There is one profile for each supported system.

The following profiles are defined:

The number_of_CA_system_ids field indicates the number of CA systems the CA subunit is compatible with.

The CA_system_id fields identify a particular CA system. The values for CA_system_id are systemic dependent and in the DVB case they are defined in pr ETS 300468 Specification for Service Information (SI) in Digital Video Broadcasting (DVB) Systems. The CA_system_id_length field defines the length in bytes of the CA_system_id field.

For each CA subunit, there is also a CA status descriptor. This holds information about the CA subunit in general, and about the information that is on each of its source plugs. The data held within this structure is dynamic and is kept up to date by the CA subunit. A controller may examine this structure in order to determine the operational status of the CA subunit and its source plugs.

The general format of the CA status descriptor is shown in FIG. 5(a).

The descriptor_length is the number of bytes for the CA subunit status descriptor structure, not including the descriptor_length field.

The CA subunit status area info block is illustrated separately in FIG. 5(b) and the source plug status area info block is illustrated separately in FIG. 5(c).

The general CA subunit status area info block contains status information about the CA subunit that is not specific to a particular destination or source plug.

The compound_length field specifies the number of bytes for the remainder of this information block (including any nested information blocks which may occur after the last well defied field).

The primary_field_length is the number of bytes for the remaining fields.

The available_bandwidth_upper and available_bandwidth_lower fields are read together and indicate the bandwidth capacity the CA subunit has available. The available_bandwidth_upper field indicates the integer amount of bandwidth available in Mbps. The available_bandwidth_lower indicates the fractional amount of bandwidth available in Mbps.

For example, if the CA subunit has 34.8 Mbps of bandwidth available it would be represented as follows.

available_bandwidth_upper=00 $22_{16}$
available_bandwidth_lower=$08_{16}$

The values of 0F $FF_{16}$ for available_bandwidth_upper and $FF_{16}$ for available_bandwidth_lower are reserved and indicate that the CA Subunit cannot determine the amount of available bandwidth.

This allows a device such as a tuner subunit to determine whether the CA subunit has enough spare capacity for additional services to be descrambled. If the CA subunit can support the simultaneous descrambling of multiple services

| implementation_profile_id | meaning |
|---|---|
| $E0_{16}$ | conformant_implementation - a CA subunit with this implementation pfofile ID was created based on the AV/C CA Specification version 1.0. The set of features (commands and data structures) supported by this implementation is defined by the manufacturer. This profile ID applies to all broadcast systems. |
| $E1_{16}$ | conformant_full_implementation - a CA subunit with this profile implementation is as described above, but it implements all of the commands and relevant data structures for the specified broadcast system, as defined in the AV/C CA Specification version 1.0. This profile ID applies to all broadcast systems. |
| All other values | reserved for future specification in this AV/C CA Specification | from multiple sources then the available_bandwidth can be read in conjunction with the destination_plug_status fields to allow a controller to determine whether it is able to connect an additional source to the CA subunit.

With respect to the source plug status area info block of FIG. 5(c), the number of source plugs field specifies the number of source plugs on the particular subunit and, hence, the number of plug status info block structures that are nested in this info block. The structures are located sequentially and not nested inside of each other. Most CA units will have only one source plug.

The plug status info block (x) fields are illustrated separately in FIG. 5(d) and provide status information for each of the source plugs. There is one of these structures for each source plug on the CA subunit, even if the plug currently has no status information to report. As shown, the fields are each split into two general areas.

The source_plug field indicates the actual source plug number.

The destination_plug field indicates the destination_plug number that this source_plug is relevant to.

The status field describes the current situation of the source_plug according to the table below.

| value | status description |
|---|---|
| $00_{16}$ | No information instances are on the specified source plug. |
| $10_{16}$ | A descrambled version of the service(s) requested for descrambling is(are) currently on the specified source plug. |
| $20_{16}$ | A descrambled version of the service(s) requested should be on the specified source plug, however it is (they are) not currently on the plug. |

Case $10_{16}$ is used when the CA subunit is functioning correctly and is outputting the requested service in a descrambled state. Case $20_{16}$ is used when the CA subunit has responded that it can descrambled the selected service but at present the descrambled service is not available on the plug.

The CA subunit Status descriptor is specific to the CA subunit type; it has the following type value.

| descriptor_type | meaning |
|---|---|
| $80_{16}$ | CA Status Descriptor |

The descriptor_type_specific_reference field does not exist because there is only one CA status descriptor for a CA subunit.

The CA subunit model does not feature any object lists.

The CA subunit commands are illustrated in FIG. 6.

CA Enable

Figure 7B:
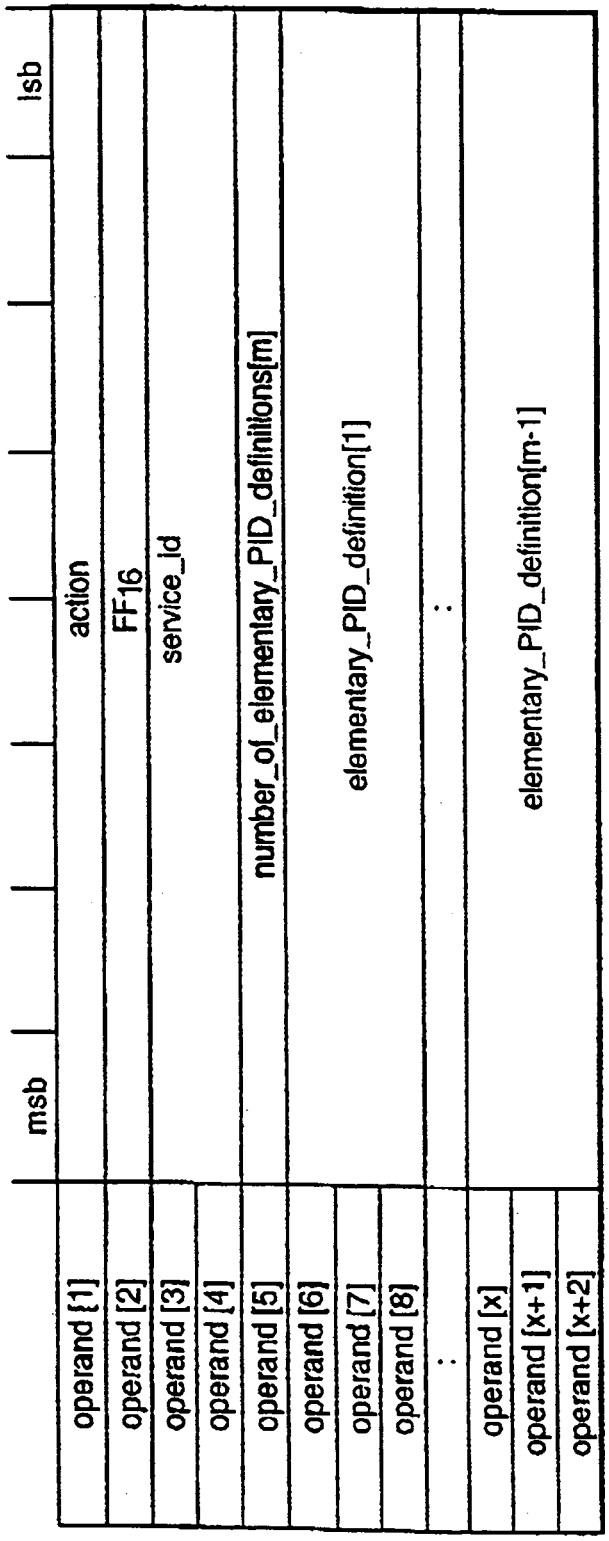
FIG. 7(b) illustrates the broadcast system specific data of FIG. 7(a)

The CA enable command is used to instruct the CA subunit as to which service it should descramble. The command is broadcast specific. The CA enable control command is illustrated in FIG. 7(a) with the broadcast systems specific data illustrated in FIG. 7(b) and the elementary PID definition illustrated in FIG. 7(c).

The system_id field denotes which broadcast system the following command relates to. The following systems are currently defined:

| system_id | name |
|---|---|
| $20_{16}$ | DVB |
| Other values | reserved |

The broadcast_system_specific_data field contains operands that are specific to the system being used.

For the DVB System the operands of FIG. 7(b) fully specify the service to be descrambled. The PID (Packet Identifier) for each component of the service is identified.

If one of the component subunits of a controller is a tuner subunit then the controller has the service_id and PID values available to it privately. However, if a controller wishes to make use of another suitable receiving device then the controller must inspect the service and component descriptors of the tuner subunit in the receiving device. The controller must define the PIDs of the components of the desired service.

A separate CA_ENABLE command is sent for each service that is to be descrambled. The action field is used to update the list of selected services stored in the CA subunit. The following values are defied.

| action | value |
|---|---|
| add | $00_{16}$ |
| update | $10_{16}$ |
| remove | $20_{16}$ |
| remove_all | $30_{16}$ |
| reserved | Other values |

When action is set to "add" the selected service is added to the list of services selected for descrambling. "update" indicates that a selected service should be modified in some way. Since the list management commands only act at the program level, any changes at the elementary stream level in an existing service must be signalled by an 'update' command with the complete elementary stream list re-sent. "remove" allows one service to be deleted from the list "remove_all" is used when the descrambling of all services is no longer required.

The service_id field specifies the service to which the program_map_PID is applicable.

The number_of_elementary_PID_definitions field indicates the number of following elementary_PID fields.

Figure 7C:
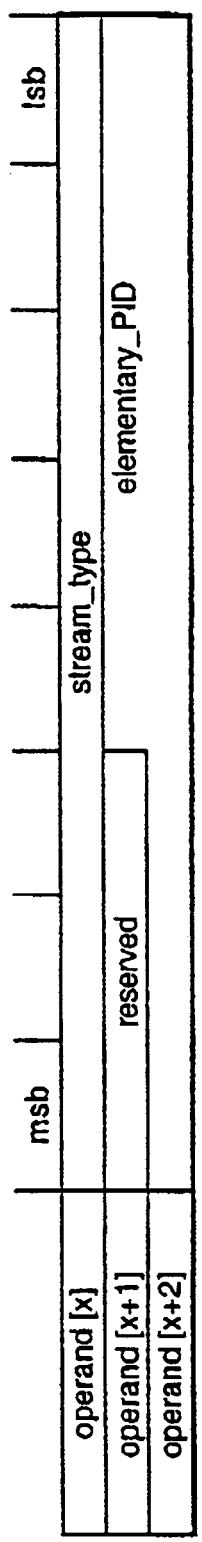
FIG. 7(c) illustrates an elementary PID definition of FIG. 7(b)

Each of the elementary PID fields correspond to the example illumed in FIG. 7(c).

The stream_type field identifies the type of service element carried within the packets with the PID whose value is specified by the elementary_PID. The values are defined in table 2-29 of ISP/IEC 13818-1 Generic Coding of Moving Picture and Associated Audio Systems.

The elementary_PID field specifies the PID of the transport stream packets that carry the associated service element.

Figure 8A:
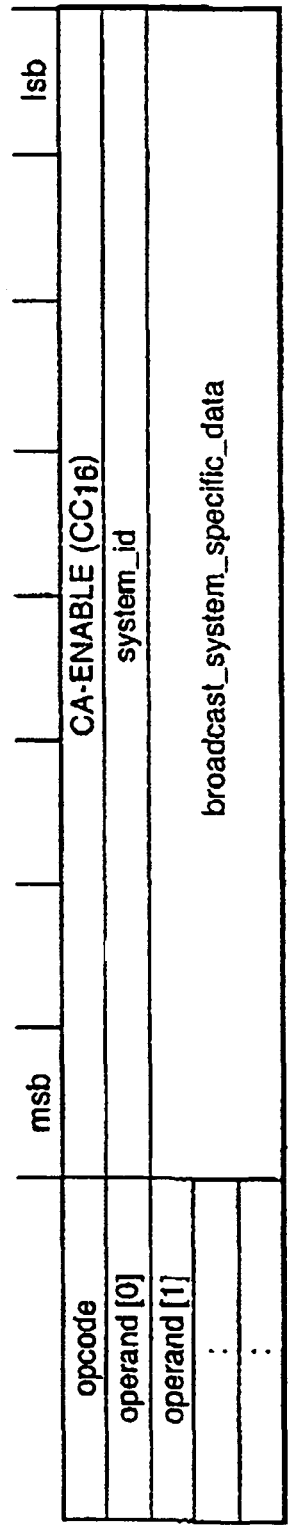
FIG. 8(a) illustrates a CA enable response.
Figure 8B:
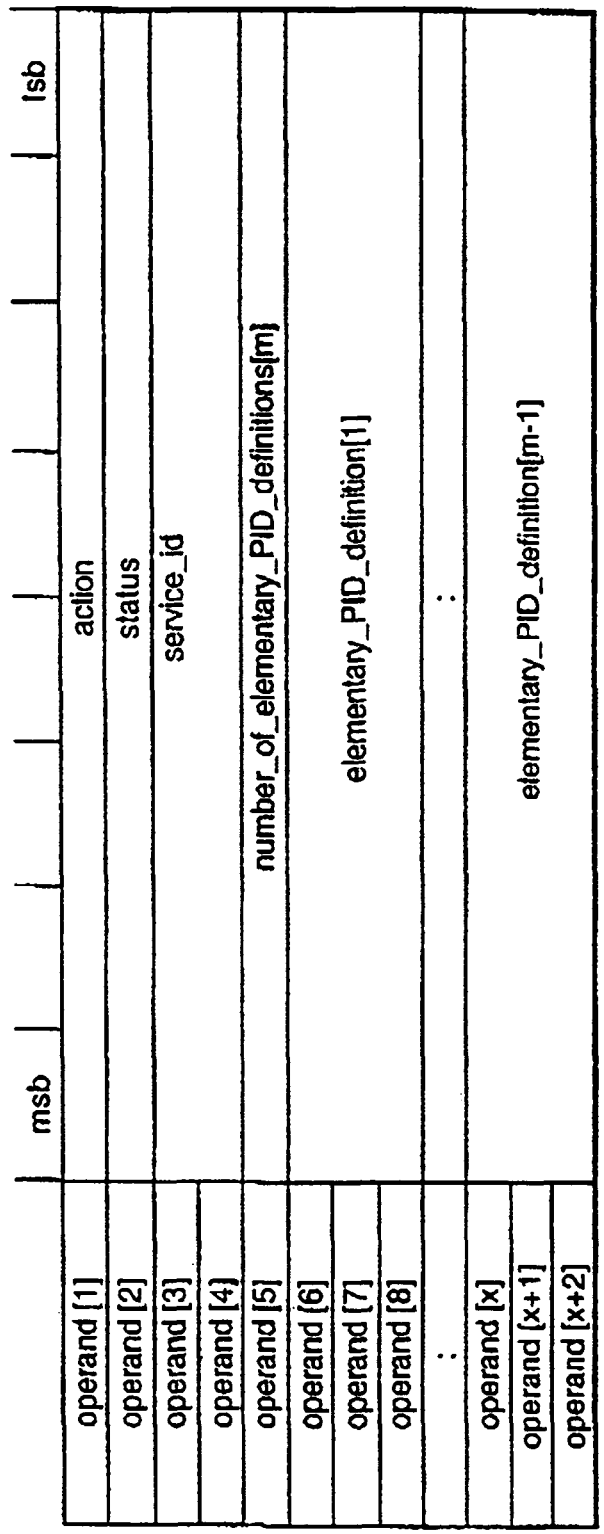
FIG. 8(b) illustrates the broadcast system specific data of FIG. 8(a)

Having received a CA enable control command, the CA subunit will produce a response as illustrated in FIG. 8(a), with the broadcast systems specific data illustrated in FIG. 8(b).

The operands have the same meaning as for the CA enable control command and the response format is the same as for the control command with the addition of the status operand.

In the case where the action is "add" or "update" and the CA enable command is successful, the response will be ACCEPTED. status can take on the following values. The value of status reflects the action.

| action | status | Value |
|---|---|---|
| add | descrambling | $00_{16}$ |
| add | descrambling possible under conditions (purchase dialog) | $01_{16}$ |
| add | descrambling possible under conditions (technical dialog) | $02_{16}$ |
| update | descrambling | $10_{16}$ |
| update | descrambling possible under conditions (purchase dialog) | $11_{16}$ |
| update | descrambling possible under conditions (technical dialog) | $12_{16}$ |
| remove | remove_successful | $20_{16}$ |
| remove_all | remove_successful | $30_{16}$ |

In the case where an add or update command is successful then the response is scrambling However there may be some cases where it is theoretically possible to descramble the service but there are certain conditions that must first be satisfied. The scrambling possible under conditions messages are returned in this case. There are two types of conditional responses, urchase dialogue and echnical dialog Both dialogs require an interaction with the user via the man machine interface (MMI).

The purchase dialog is required, for example, where the user has requested a pay per view service. Here a dialog with the user might be required to confirm the cost of the service before viewing can commence.

The technical dialog is required when there is a technical issue to overcome before the CA subunit can determine whether it is possible or not to descramble the service. This could occur, for example, when the user needs to insert the smart card.

In the case where the CA_ENABLE command is unsuccessful the response frame will use the response code of REJECTED. The status field will take on the following values to reflect the nature of the error. The value of status reflects the action.

| action | status | Value |
|---|---|---|
| add | descrambling not possible | $80_{16}$ |
| add | descrambling not possible (because no entitlement) | $81_{16}$ |
| add | descrambling not possible (for technical reasons) | $82_{16}$ |
| add | descrambling not possible (Insufficient bandwidth in CA subunit) | $83_{16}$ |
| add | descrambling not possible (Incompatible CA system) | $84_{16}$ |
| update | descrambling not possible | $90_{16}$ |
| update | descrambling not possible (because no entitlement) | $91_{16}$ |
| update | descrambling not possible (for technical reasons) | $92_{16}$ |
| update | descrambling not possible (Insufficient bandwidth in CA subunit) | $93_{16}$ |
| update | descrambling not possible (Incompatible CA system) | $94_{16}$ |
| remove | remove failed - service not present | $A0_{16}$ |
| remove | remove failed - unknown reason | $A1_{16}$ |
| remove_all | remove failed - service not present | $B0_{16}$ |
| remove_all | remove failed - unknown reason | $B1_{16}$ |

Figure 9:
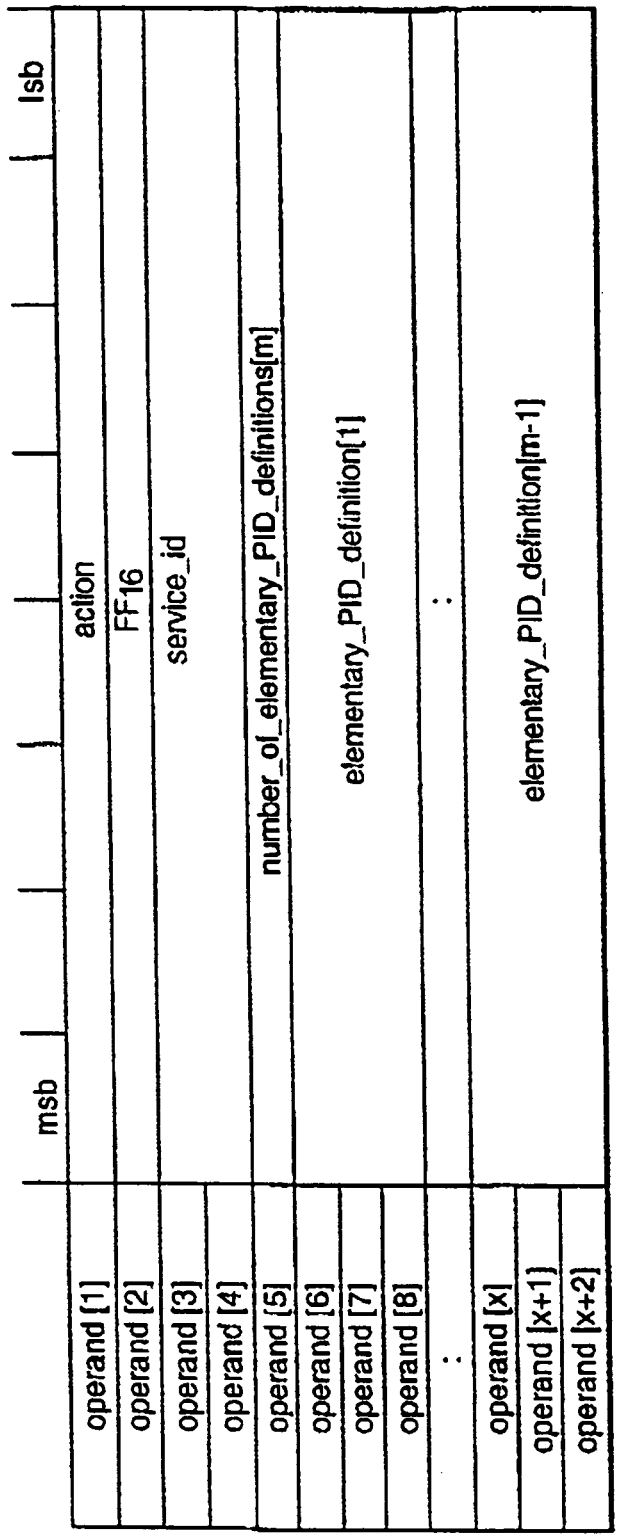
FIG. 9 illustrates status or notify command structure.

The CA enable command can also be sent with a ctype of STATUS and NOTIFY. These are signified by "S" and "N" in FIG. 6. The status and notify command frames have the same form as the control command. The command is used to determine whether the CA subunit is capable of descrambling the selected service. The broadcast system specific data for DVB systems specific operand is illustrated in FIG. 9. The fields are the same as for the control command.

Figure 10:
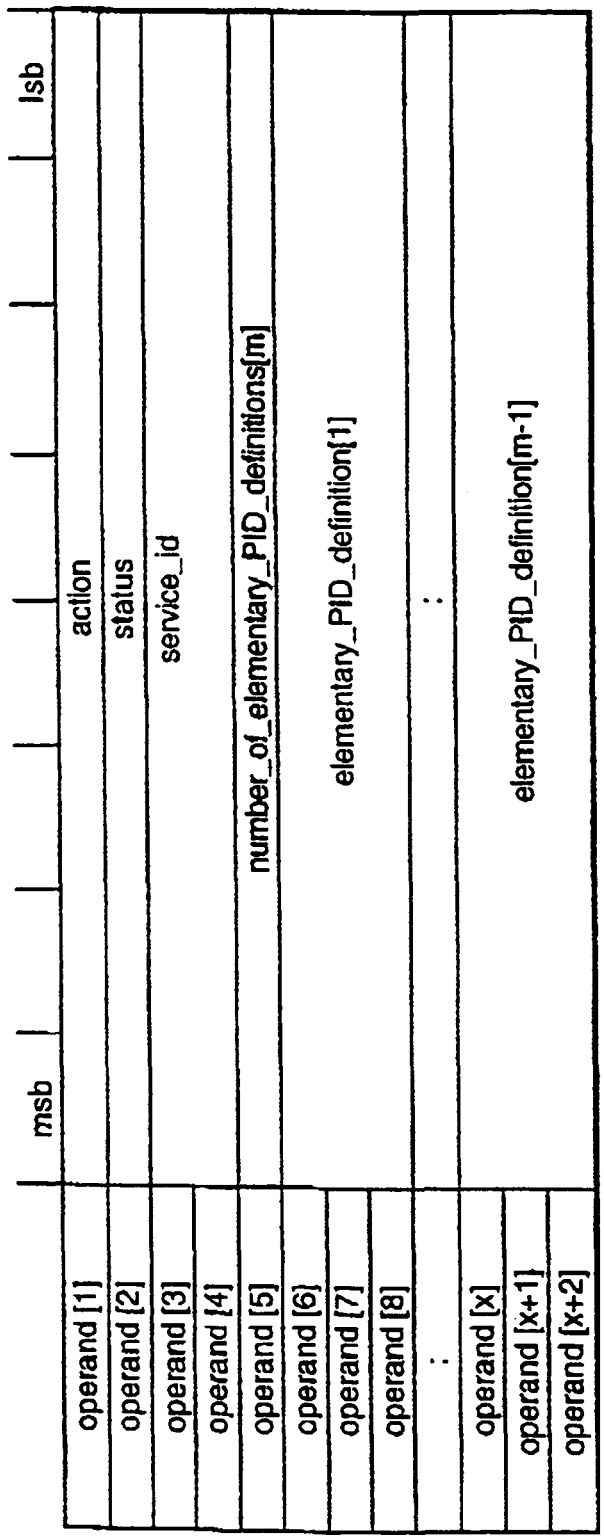
FIG. 10 illustrates status or notify response structure.

In response to a CA enable status and notify command, the CA subunit makes a response. The broadcast system specific data for the DVB system specific operands is illustrated in FIG. 10.

The fields are the same as for the COMMAND response with the exception of the status field, which can take the values defined below. The "remove" action is not valid for STATUS or NOTIFY commands.

| action | status | Value |
|---|---|---|
| add | descrambling will be possible | $00_{16}$ |
| add | descrambling will be possible under conditions (purchase dialog) | $01_{16}$ |
| add | descrambling will be possible under conditions (technical dialog) | $02_{16}$ |
| update | descrambling will be possible | $10_{16}$ |
| update | descrambling will be possible under conditions (purchase dialog) | $11_{16}$ |
| update | descrambling will be possible under conditions (technical dialog) | $12_{16}$ |
| add | descrambling will not be possible | $80_{16}$ |
| add | descrambling will not be possible (because no entitlement) | $81_{16}$ |
| add | descrambling will not be possible (for technical reasons) | $82_{16}$ |
| add | descrambling will not be possible (Insufficient bandwidth in CA subunit) | $83_{16}$ |
| add | descrambling will not be possible (Incompatible CA system) | $84_{16}$ |
| update | descrambling will not be possible | $90_{16}$ |
| update | descrambling will not be possible (because no entitlement) | $91_{16}$ |
| update | descrambling will not be possible (for technical reasons) | $92_{16}$ |
| update | descrambling will not be possible (Insufficient bandwidth in CA subunit) | $93_{16}$ |
| update | descrambling will not be possible (Incompatible CA system) | $94_{16}$ |

CA Entitlement

The CA entitlement command may be used by EPG Electronic Program Guide) applications to interrogate the CA subunit in order to determine what entitlement the user has to services found in the electronic program guide. For instance, when displaying the EPG, having interrogated the CA subunit to determine what programs can be descrambled, the EPG can indicate which of the programs the user is able to view. The command can be used with a ctype of STATUS and NOTIFY. This command does not prevent EPG and CA applications from the same or cooperating suppliers to develop private means of passing entitlement information. This command can be used by independent EPGs to interrogate CA modules.

Figure 11A:
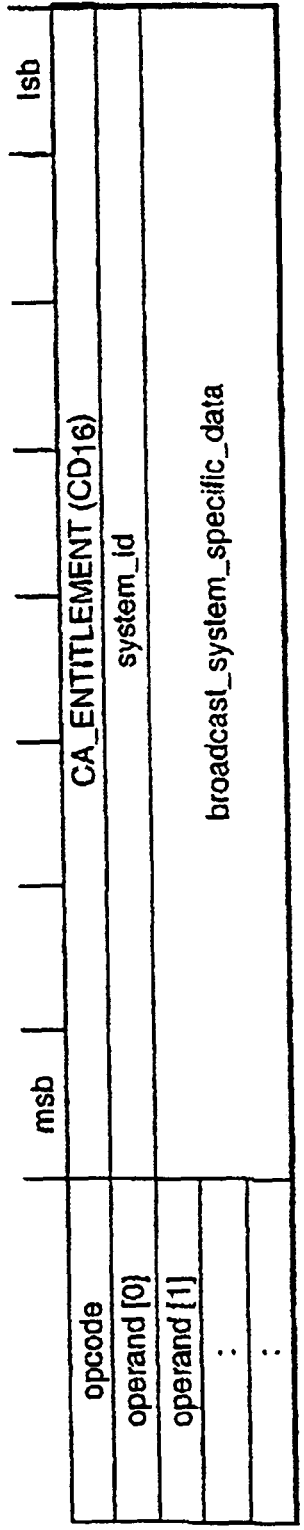
FIG. 11(a) illustrates a CA entitlement command.
Figure 11B:
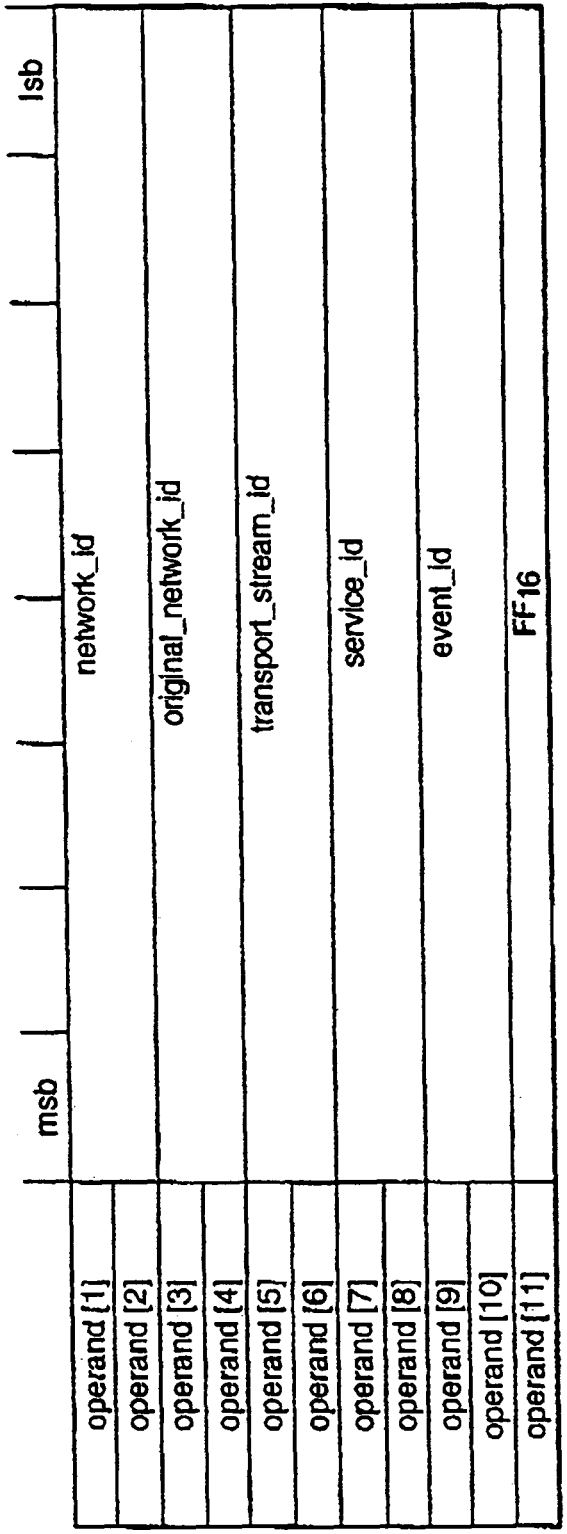
FIG. 11(b) illustrates the broadcast system specific data of FIG. 11(a)

The CA entitlement command is illustrated in FIG. 11(a) with the broadcast systems specific data for the DVB system being illustrated in FIG. 11(b).

The system ID field has the same meaning as for the CA enable command.

The operands network ID, original network ID, transport stream ID, service ID and event ID specify the service that the entitlement query is for. The event ID is fully qualified by the other location identifiers in the service information.

In response to a CA entitlement command, the CA subunit issues a response illustrated by FIG. 12(a) with the broadcast system specific data for the DVB system illustrated in FIG. 12(b).

The operands network_id, original_network_id, transport_stream_id, service_id and event_id are the same as for the command. The entitlement_status field denotes the whether or not the user has entitlement to the selected service.

resources that the CA system may also require such as a modem and/or smart card reader can be implemented and accessed privately when they form part of the same unit.

The procedure for decoding a scrambled transport stream is described with reference to FIG. 14. The following assumes that the tuner subunit will be the source of the scrambled stream, either an off air signal via a suitable font end or directly from the demux via an alternative source such as a DVCR. The user will a make a channel selection and the tuner subunit will detect that the stream is scrambled.

The controller can make an intelligent prediction as to which CA subunit to use based upon the CA_system_id field

| value | entitlement_status | Description |
| --- | --- | --- |
| 00 | entitlement unknown | The CA subunit cannot determine the entitlement status for this service |
| 01 | entitlement available | Entitlement for this service is currently available |
| 02 | entitlement not available | Entitlement for this event is currently available and cannot be made available by any user dialogue with the CA subunit |
| 03 | user dialogue required | Entitlement not currently available but could be made available after a user dialogue with the CA subunit |
| 04 | user dialogue complete unknown | The user dialogue is complete the entitlement is unknown |
| 05 | user dialogue complete available | The user dialogue is complete and entitlement has been granted |
| 06 | user dialogue complete not available | The user dialogue is complete and entitlement has not been granted |
| other values | reserved | The remaining values are reserved for future use |

Security

Although the concept of the CA Subunit is to allow generic receivers to work with multiple CA systems there may be some cases when a service provider will wish to associate a certain CA Subunit with a certain IRD (Integrated Receiver Decoder). In this case authentication is used between the CA Subunit and the IRD to ensure that each device only works with its respective partner.

Figure 13:
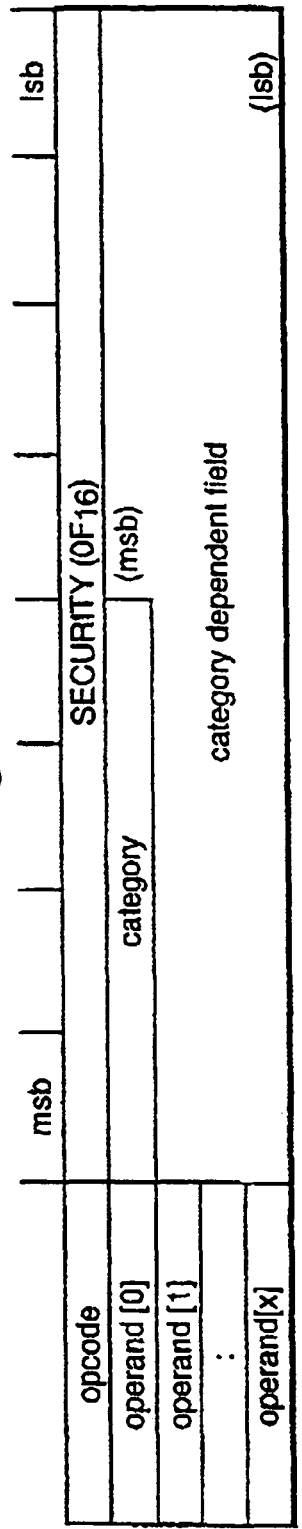
FIG. 13 illustrates a security control command.

The SECURITY command is illustrated in FIG. 13 and is independent of broadcast system as it is uniquely defined for each application. The authentication protocol is a process whereby the IRD and CA Subunit pass between themselves control codes to allow each device to satisfy itself that the other is genuine. The authentication protocol could be as simple as transferring two known keys between the devices or a more complex key exchange based upon, for example, public key protocols.

The category field defines the authentication and key exchange protocol that is used in the following category dependant field.

Implementation

The following provides an explanation as to how the CA Subunit can be implemented and the procedure that can be followed to make use of the CA Subunit.

The NCAM is a logical collection of subunits that provide the required functionality to implement a networked conditional access system. The CA subunit is the core of the system and relies on other subunits to provide a source and sink for the material that requires descrambling and communication with both the user and outside world. As such the CA subunit should be aware of the tuner subunit and panel subunit.

Figure 15:
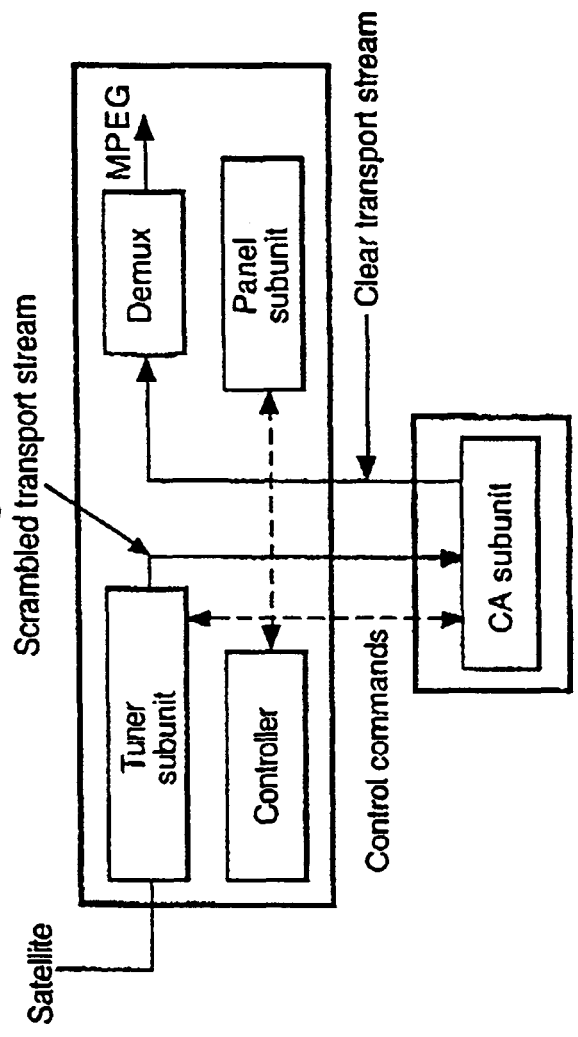
FIG. 15 illustrates a satellite IRD connected to a network conditional access module.

The NCAM can be implemented with only the tuner, CA and Panel subunits; these are the minimum requirements. The from the transport stream and CA_system_id of the CA subunit For example in FIG. 15 satellite IRD is connected to a CA Subunit via 1394.

The controller establishes an isochronous channel between the tuner and CA subunits to transmit the scrambled service to the CA subunit A second channel from the CA subunit to the desired sink, this can be the unit that originates the scrambled source material or a separate unit, is set up. The 5C Copy Protection system or any other suitable alternative copy protection mechanism can be used to protect the descrambled transport stream from unauthorised copying.

The controller then sends the CA_ENABLE command to inform the CA subunit of which service or services it would like descrambled. When the CA subunit receives the CA_ENABLE command it determines whether or not it is capable of descrambling the selected service. This may involve setting up a dialogue with the user to determine whether they are prepared to pay for the service or request them to insert their bank card or pin number. Some communication with the outside world via the modem may be required.

If following the user dialogue the CA subunit is capable of descrambling the selected services it updates its internal status registers and starts output the descrambled data.

Due to the nature of AV/C commands whereby each command requires a response, if the original CA_ENABLE command is met with a REJECTED response due to a user or technical dialogue being required then once the dialogue is resolved the controller will not know the outcome. Therefore if a CA_ENABLE command is rejected for dialogue reasons then the controller should send a NOTIFY command to be informed when the state of the CA subunit changes.

EMM Handling

In some implementations of a DTV receiver the CA module can receive EMMs whilst the DTV is in standby and on power states. This allows the CA module to continually update the entitlement that the user has.

In a network environment the TS must be routed to the CA subunit to allow the subunit to process the EMM packets. This means that if the CA subunit remains powered off or a TS is not connected to it for a period of time then the entitlement stored in the CA subunit may become out of date. Therefore at periodic intervals the CA subunit should contact the tuner subunit and request the TS for a period of time to allow it to update the EMMs. This should be done at times when the user experience will not be compromised. The controller should ensure that the channel is not changed while the user is watching a particular service.

No Tuner Subunit

The benefit of using a CA subunit in a network where a tuner subunit also exists comes when the controller is external to both the unit that contains the tuner subunit and the unit that contains the CA subunit. This allows the controller to discover the services that the tuner subunit is capable of receiving and can instruct the CA subunit to descramble a number of these services.

In some cases the CA subunit will exist in a network where there is no tuner subunit. In this case in order for a device to make use of the CA subunit the controller must exist in the same unit as that of the signal source. The controller must be capable of privately inspecting the transport stream and determining the PIDs of the elements of the service it wishes descrambled. Again the EMM stream must be included with the PIDs of the elements that are to be descrambled.

The invention claimed is:

1. A digital video signal receiver, comprising:
a tuner for receiving a scrambled digital video signal;
an interface for outputting said scrambled digital video signal to a conditional access subunit attachable to said receiver and for inputting a local scrambled digital video signal from said conditional access subunit;
a local descrambler for descrambling said locally scrambled digital video signal received from said conditional access subunit; and
a demultiplexer for receiving and demultiplexing said local descrambled digital video signal,
wherein, in response to a CA command, the conditional access subunit issues a response and a status, wherein the status indicates descrambling is not possible because of no entitlement,
wherein the CA command includes operands for specifying the number of elementary PID (Packet Identifier) definitions to follow, and for identifying a type of service element carried within packets with the PID whose value is specified by the elementary PID.

2. The digital video signal receiver according to claim 1, wherein said receiver is authenticated and allowed to locally descramble said local scrambled digital video signal only when it is descrambled that said receiver is authorized.

3. The digital video signal receiver according to claim 1, further comprising:
means for producing a partial transport stream wherein said interface outputs the partial transport stream to said conditional access subunit.

4. A conditional access subunit attachable to a digital video signal receiver, comprising:
an interface for inputting a scrambled digital video signal from said receiver;
a descrambler for descrambling said inputted scrambled digital video signal;
a local scrambler for locally scrambling said descrambled digital video signal and for outputting said locally scrambled digital video signal to said digital video signal receiver through said interface; and
an authenticator for authenticating said digital video signal receiver,
wherein, in response to a CA command, the conditional access subunit issues a response and a status, wherein the status indicates descrambling is not possible because of no entitlement,
wherein the CA command includes operands for specifying the number of elementary PID (Packet Identifier) definitions to follow, and for identifying a type of a service element carried within packets with the PID whose value is specified by the elementary PID.

5. The conditional access subunit according to claim 4, wherein said local scrambler scrambles said descrambled digital video signal and outputs said locally scrambled digital video signal only when it is determined said receiver is authorized.

6. The conditional access subunit according to claim 4, wherein
the interface further inputs a partial transport stream produced by the digital video receiver, from the digital video receiver, and said descrambler descrambles said partial transport stream.

7. A digital video signal receiving system, comprising:
a tuner for receiving a scrambled digital video signal;
an interface for outputting said scrambled digital video signal to a conditional access subunit attachable to a digital video receiver and for inputting a local scrambled digital video signal from said conditional access subunit;
a local descrambler for descrambling said locally scrambled digital video signal received from said conditional access subunit; and
a demultiplexer for receiving and demultiplexing said local descrambled digital video signal; and
a conditional access subunit attachable to said digital video receiver, comprising:
an interface for inputting a scrambled digital video signal from said receiver;
a descrambler for descrambling said inputted scrambled digital video signal;
a local scrambler for locally scrambling said descrambled digital video signal and for outputting said locally scrambled digital video signal to said digital video signal receiver through said interface; and
an authenticator for authenticating the digital video signal receiver,
wherein, in response to a CA command, the conditional access subunit issues a response and a status, wherein the status indicates descrambling is not possible because of no entitlement,
wherein the CA command includes operands for specifying the number of elementary PID (Packet Identifier) definitions to follow, and for identifying a type of service element carried within packets with the PID whose value is specified by the elementary PID.

8. A method of descrambling digital video signals, comprising the steps of:
receiving a scrambled digital video signal by a receiver;
outputting said received scrambled digital video signal to a conditional access subunit attachable to said receiver;
descrambling said scrambled digital video signal by said conditional access subunit;
locally scrambling said descrambled digital video signal by said conditional access subunit;

outputting the locally scrambled digital video signal from said conditional access subunit to said receiver;

locally descrambling said locally scrambled digital video signal received from said conditional access sub-unit by said receiver; and demultiplexing said locally descrambled digital video signal, wherein, in response to a CA command, the conditional access subunit issues a response and a status, wherein the status indicates descrambling is not possible because of no entitlement, wherein the CA command includes operands for specifying the number of elementary PID (Packet Identifier) definitions to follow, and for identifying a type of service element carried within packets with the PID whose value is specified by the elementary PID.

9. The method according to claim 8, further comprising:

authenticating the receiver; and allowing the receiver to locally descramble said locally scrambled digital video signal only when it is determined that the receiver is authorized.

10. The method according to claim 9 further comprising steps of:

producing a partial transport stream by said receiver;

outputting said partial transport stream from said receiver to said conditional access subunit.

* * * * *